US00RE38865E

(19) United States
(12) Reissued Patent
Dumarot et al.

(10) Patent Number: US RE38,865 E
(45) Date of Reissued Patent: Nov. 1, 2005

(54) SYSTEM AND METHOD FOR OPTIMIZING COMPUTER SOFTWARE AND HARDWARE

(75) Inventors: Daniel Peter Dumarot, Cornwall, NY (US); David Alan Stevenson, Poughkeepsie, NY (US); Nicolas Richard Dono, Hopewell Jtn., NY (US); James Randall Moulic, Poughkeepsie, NY (US); Clifford Alan Pickover, Yorktown Hts., NY (US); Bengt-Olaf Schneider, Yorktown Hts., NY (US); Adelbert Smith, Poughkeepsie, NY (US)

(73) Assignee: International Business Machines Corporation, Armonk, NY (US)

(21) Appl. No.: 10/141,383

(22) Filed: May 8, 2002

Related U.S. Patent Documents

Reissue of:
(64) Patent No.: 6,059,842
Issued: May 9, 2000
Appl. No.: 09/060,028
Filed: Apr. 14, 1998

(51) Int. Cl.[7] ..... G06F 9/45
(52) U.S. Cl. ..... 717/153; 345/846; 345/961; 345/965; 345/967
(58) Field of Search ..... 717/121, 122, 717/127, 153; 345/846, 961

(56) References Cited

U.S. PATENT DOCUMENTS 5,263,164 A * 11/1993 Kannady et al. ..... 713/1
5,428,791 A * 6/1995 Andrew et al. ..... 717/121
5,436,748 A * 7/1995 Vinel et al. ..... 359/125
5,497,490 A * 3/1996 Harada et al. ..... 713/100
5,506,952 A * 4/1996 Choy et al. ..... 345/763
5,530,887 A * 6/1996 Harper et al. ..... 710/104
5,613,125 A * 3/1997 Nguyen et al. ..... 713/1
5,668,992 A * 9/1997 Hammer et al. ..... 713/1
5,668,995 A * 9/1997 Bhat ..... 718/104
5,713,009 A * 1/1998 DeRosa et al. ..... 713/2
5,745,880 A * 4/1998 Strothmann ..... 705/7
5,784,539 A * 7/1998 Lenz ..... 706/45
5,809,282 A * 9/1998 Cooper et al. ..... 709/226
5,815,152 A * 9/1998 Collier et al. ..... 345/839
5,822,565 A * 10/1998 DeRosa et al. ..... 703/24
5,944,819 A * 8/1999 Kumar et al. ..... 713/1
5,978,594 A * 11/1999 Bonnell et al. ..... 710/17
6,177,860 B1 * 1/2001 Cromer et al. ..... 340/10.1

* cited by examiner

*Primary Examiner*—Antony Nguyen-Ba
(74) *Attorney, Agent, or Firm*—Douglas W. Cameron; Anne Vachon Dougherty

(57) ABSTRACT

A method of optimizing the operation of a computer system in running application programs in accordance with system capabilities, user preferences and configuration parameters of the application program. More specifically, with this invention, an optimizing program gathers information on the system capabilities, user preferences and configuration parameters of the application program to maximize the operation of the application program or computer system. Further, user selected rules of operation can be selected by dragging rule icons to target optimizer icon.

58 Claims, 7 Drawing Sheets

SYSTEM AND METHOD FOR OPTIMIZING COMPUTER SOFTWARE AND HARDWARE

Matter enclosed in heavy brackets [ ] appears in the original patent but forms no part of this reissue specification; matter printed in italics indicates the additions made by reissue.

TECHNICAL FIELD

This invention relates to the optimization of computer software and hardware, and in particular to optimization according to user-specified preferences, databases, and dynamic monitoring of system behavior and performance.

BACKGROUND OF THE INVENTION

Computer operating systems include a large number of parameters, many of which may be queried, controlled, and changed in order to alter the characteristics of the computer system. Similarly, software applications running on computer systems also often include a large number of parameters, many of which may be controlled and changed to alter the characteristics of the application running on the computer system. As an example, in Microsoft's Windows NT operating system, the resolution and color characteristics of the computer system's display may be changed by selecting the "Control Panel" icon from a "Settings" menu item. When the control panel is displayed, a user is presented with a set of new icons, one of which ("Display Properties") may be selected to bring up another panel containing a set of tabs. The "Settings" tab on the "Display Properties" panel may be selected which allows a user to manually change the number of colors, resolution, video refresh rate, font size, and related graphical characteristics. The user specifies the refresh frequency by selecting from a pull-down menu list of available settings (e.g. 60 Hz, 70 Hz, etc.). The user can specify the screen resolution by selecting a slider icon and moving it right or left to increase or decrease the screen resolution (e.g., from 1024×1280 pixels to 600×800 pixels). Some of these settings may affect the performance of applications running on the system. For example, decreasing the color resolution and screen resolution may increase the speed of some graphics applications.

This example focuses on system settings. When one also considers the numerous application settings and various different hardware configurations available to users, and the interaction of all of these settings and configurations, the control accessing of the plurality of settings and configurations can be cumbersome and often requires detailed knowledge on the part of computer users. The need for a dynamic, semi-automatic, consolidated, and rule-based system that changes such settings and other aspects of the computer system, and makes recommendations, becomes apparent. Although many graphical user interfaces exist to control various aspects of the system (such as the graphical slider which controls screen resolution for Windows platforms) and in applications, the need for improved graphical user interfaces becomes apparent as computer systems become more complex.

With reference now to the figures and in particular to FIG. 1, there is illustrated a computer system in accordance with the method and system of the present invention. Typically the computer system 12 includes a computer 36, a computer display 38, a keyboard 40, and multiple input pointing devices 42. Those skilled in the art will appreciate that input pointing devices may be implemented utilizing a pointing stick 44, a mouse 46, a track ball 48, a pen 50, display screen

52 (e.g. a touch display screen 52), or any other device that permits a user to manipulate objects, icons, and other display items in a graphical manner on the computer display 38. Connected to the computer system may also be audio speakers 54 and/or audio input devices 51. (See for example, IBM's Voice Type Dictation system. "Voice Type" is a trademark of the IBM Corporation.) A graphical user interface may be displayed on screen 52 and manipulated using any input pointing device 42. This graphical user interface may include display of an application 60 that displays information pages 62 using any known browser. The information pages may include graphical, audio, or text information 67 presented to the user via the display screen 52, speakers 54, or other output device. The information pages may contain selectable links 66 to other information pages, where such links can be activated by one of the input devices, like mouse 46, to request the associated information pages. This hardware is well known in the art and is also used in conjunction with televisions ("web TV") and multimedia entertainment centers. The system 12 contains one or more memories (See 65 of FIG. 2.) where a remote computer 130, connected to the system 12 through a network 110, can send information. Here the network can be any known (public or privately available) local area network (LAN) or wide area network (WAN), e.g., the Internet. The display may be controlled by a graphics adaptor card such as an Intergraph Intense 3D, Graphical user interfaces (GUIs) provide ways for users of computers and other devices to effectively communicate with the computer. In GUIs, available applications and data sets are often represented by icons 63 consisting of small graphical representations which can be selected by a user and moved on the screen. The data sets (including pages of information) and applications may reside on the local computer or on a remote computer accessed over a network. The selection of icons often takes the place of typing in a command using a keyboard in order to initiate a program or access a data set. In general, icons are tiny on-screen symbols that simplify access to a program, command, or data file. Icons are often activated or selected by moving a mouse-controlled cursor onto the icon and pressing one or more times on a mouse button.

GUIs include graphical images on computer monitors and often consist of both icons and windows. (GUIs may also reside on the screens of televisions, kiosks, personal digital assistants (PDAs), automatic teller machines (AIMs), and on other devices and appliances such as ovens, cameras, video recorders and instrument consoles.) A computer window is a portion of the graphical image that appears on the monitor and is dedicated to some specific purpose. Windows allow the user to treat the graphical images on the computer monitor like a desktop where various files can remain open simultaneously. The user can control the size, shape, and position of the windows.

Although the use of GUIs with icons usually simplifies a user's interactions with a computer, GUIs are often tedious and frustrating to use. Icons must be maintained in a logical manner. It is difficult to organize windows and icons when many are similarly displayed at the same time on a single device.

In a drag-and-drop GUI, icons are selected 64 and moved 68 (i.e. "dragged") to a target icon 69 to achieve a desired effect. For example, an icon representing a computer file stored on disk may be dragged over an icon containing an image of a printer in order to print the file, or dragged over an icon of a trash can to delete the file. An icon representing a page of information on the World Wide Web may be selected and dragged to a trash can to delete the link to the page of information. The page of information may be on the local machine or on a remote machine. A typical user's screen contains many icons, and only a subset of them will at anyone time be valid, useful targets for a selected icon. For example, it would not be useful to drag the icon representing a data file on top of an icon whose only purpose is to access an unrelated multimedia application.

Icons 63 could include static or animated graphics, text, multimedia presentations, and windows displaying TV broadcasts. Icons 63 could also include three dimensional images, for example, those used in virtual reality applications.

SUMMARY OF THE INVENTION

An object of this invention is a method and system for increasing the apparent speed of a computer by automatically optimizing software and hardware according to user-specified preferences.

Another object of this invention is to provide a method and system for increasing the apparent speed of a computer using a database.

Yet another object of this invention is to provide a method and system for effectively increasing the apparent speed of a computer based on results obtained by dynamically monitoring system behavior and performance.

This invention permits users to conveniently optimize software running on a computer. The term "optimize" refers to running of a computer system or software more efficiently, for example, by maximizing both the speed with which a software application runs and user satisfaction, and/or minimizing cost or resource use. "Optimization" includes the setting of various parameters in hardware, operating system software, or application software such that the system as a whole runs as efficiently as possible. These parameters might be set to optimize speed, system resource cost, or other variables corresponding to a user's satisfaction.

Accordingly, this invention provides for a method of enhancing, for example, program application performance on a computer system. With this invention configuration information and performance capabilities based on characteristics of the program/system are determined. Then, the configuration information and the performance capabilities are used to optimize configuration parameters of the program applications so as to enhance the performance of the workstation in running the program'system. Further, with this invention user preferences in the operation of the program are selected by, for example, dragging rule icons to a target optimizer icon to provide user selected rules of operation of the application program.

BRIEF DESCRIPTION OF THE DRAWINGS

The invention will be further understood by reference to the following detailed description when read in conjunction with the accompanying drawings, wherein.

DESCRIPTION OF THE PREFERRED EMBODIMENT

Figure 2:
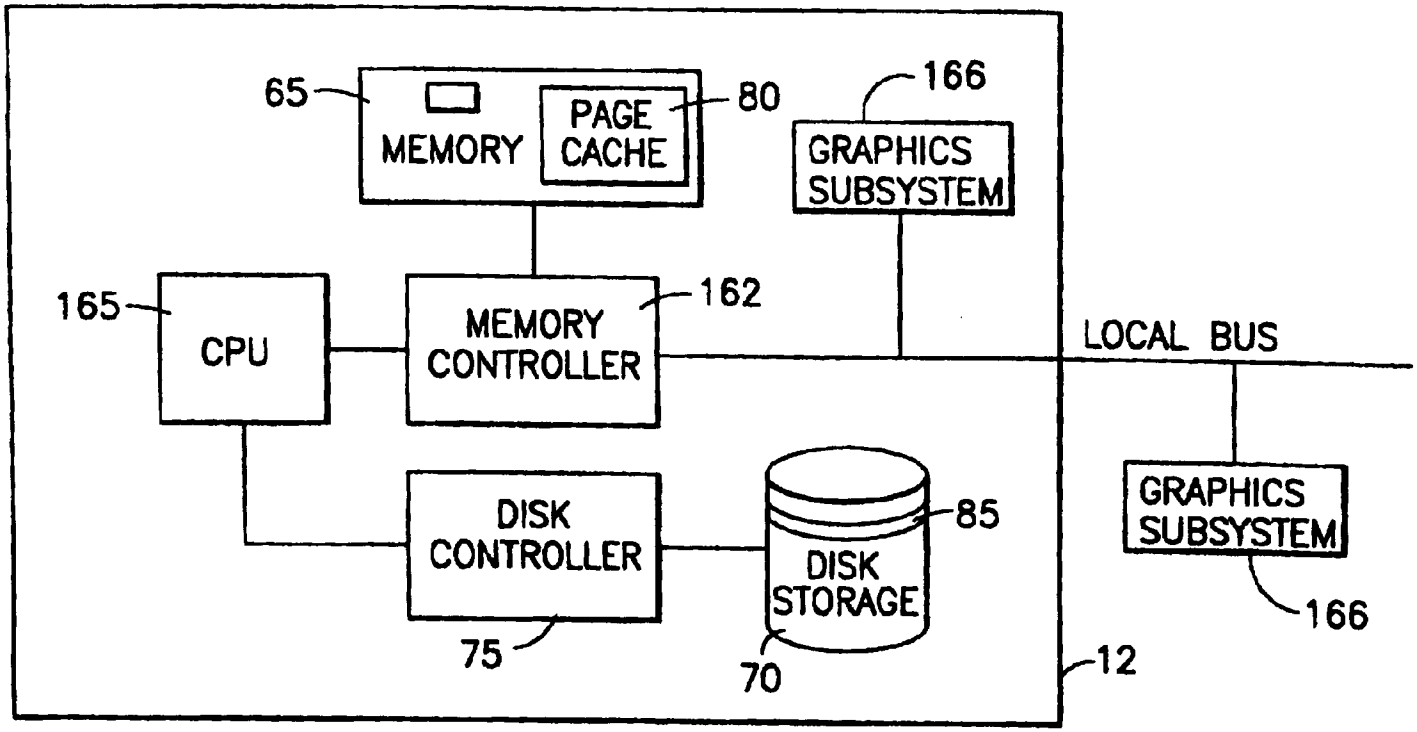
FIG. 2 is a block diagram of the computer system architecture showing an optimization database.

With reference now to FIG. 2, there is illustrated a block diagram of the architecture of the computer system 12 in accordance with the present invention.

The core architecture includes a Central Processing Unit 165, memory controller 162, system memory 65, disk storage 70, disk storage controller 75, and graphics subsystem 166. The computer system 12 can be either a stand alone workstation or a server and a workstation connected to each other via a communications network such as the internet. A portion of the system memory is set aside for an optimizer-database cache 80. Additionally, file space 85 on the disk storage unit 70 may be set aside for the optimizer database 140. Generally speaking, a cache or buffer is a place where data (files, images, and other information) can be stored to avoid having to read the data from a slower device, such as a remote, network-attached computer disk. For instance, a disk cache can store information that can be read without accessing remote disk storage.

Figure 3:
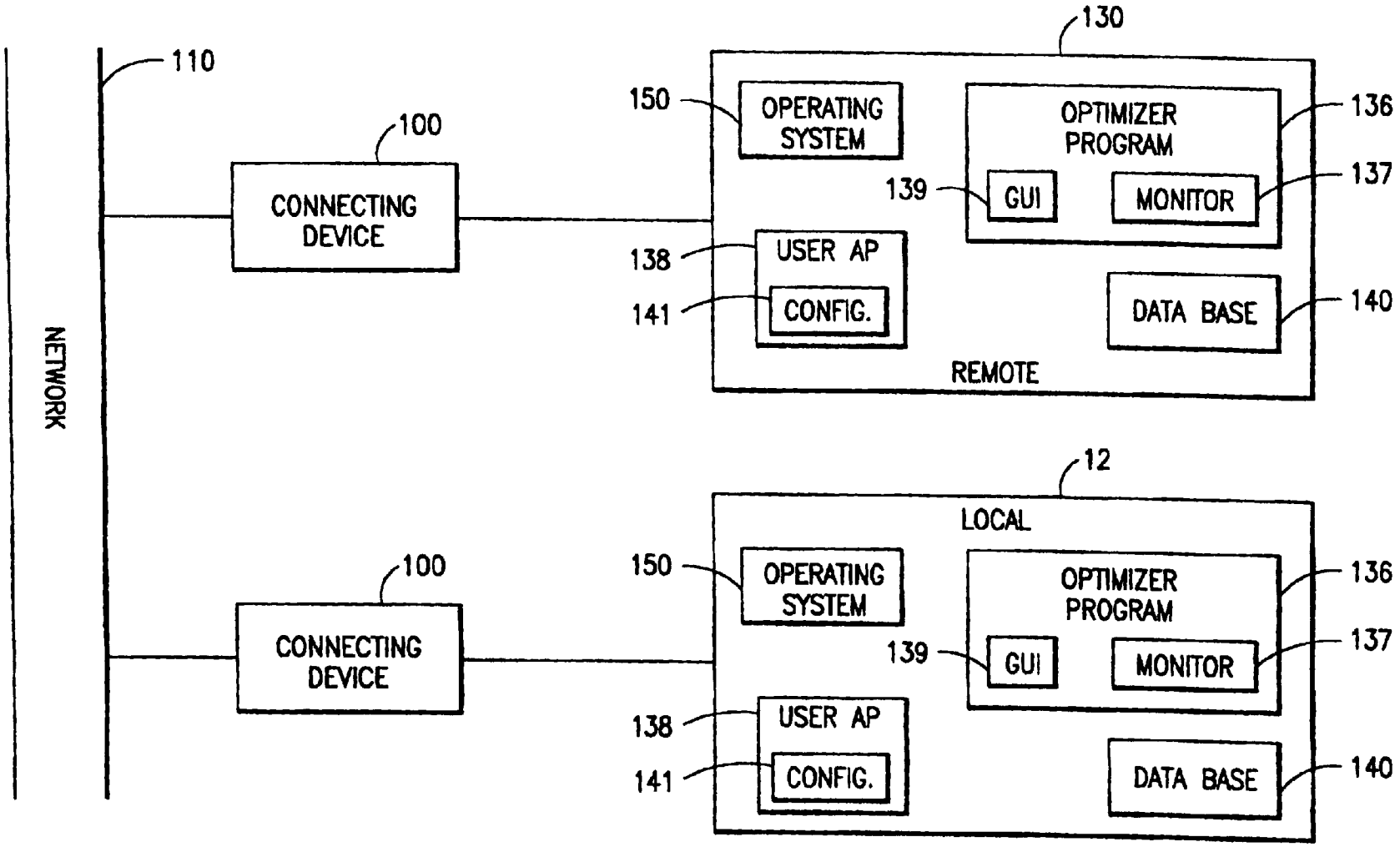
FIG. 3 is a block diagram showing portions of a computer network wherein a local computer and a remote computer are both connected directly to the network.

With reference now to FIG. 3, there is illustrated a partial portion of a computer network in accordance with the method and system of the present invention. Computer system 12 connects to the network backbone 110 by means of a connecting device 100. Also connected to the network 110 are one or more server computers 130 by means of their own connecting device 100'. Those skilled in the art will appreciate that these connecting devices 100 may take various forms, including modems, token-ring hubs, and other network-enabling devices depending on the capabilities and technology of the connecting devices. The remote computer 130 may include an area of system memory and/or disk storage space dedicated to storing and maintaining a optimization database table 140 (e.g. data file). The optimization database table 140 may reside on the local client or reside on both the client and remote computer. Portions of the optimizer program 136 may reside on the local computer and/or the remote computer. The optimizer program contains or accesses a dynamic monitor 137 of system and application activity. Various user applications 138 run on the remote or local computer. For example, these applications may be office productivity, scientific and engineering, finance, transaction processing, Internet, or any other software a user needs to run. Such applications may be controlled by a configuration file 141 or a central database that controls particular settings of the application that may affect application performance. The optimizer program 136 may contain a graphical user interface 139, used to specify settings or provide information to the user. An operating system 150 runs on the local computer. The operating system, such as Windows NT, primarily provides an interface between the user application and the computer hardware. The operating system also provides services on behalf of the user and applications such as networking, file management, etc.

Figure 4:
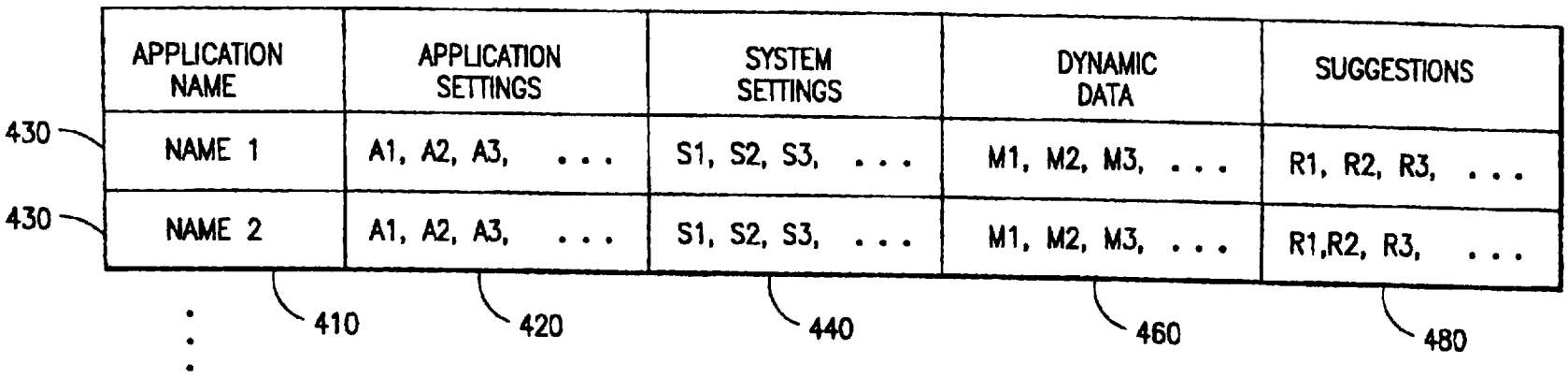
FIG. 4 are example database records that may be used for optimization.

FIG. 4 includes example records 430 for optimizing system performance. The set of records comprise the database 140. Application settings 420 may consist of a set of control parameters A1, A2, . . . , AN shown in this example in rows 430 and associated with a particular unique identifier 410 for a software application. The software application may be designated in the database 140 as an alphanumeric string 410. By way of example, parameter A1 may control the graphical quality of an engineering application's 3-D graphics. Lower graphical quality often implies faster use of an application. System settings 440 contain information usually relating to static qualities of the computer system such as the particular operating system, amount of memory, processor speed, graphics card name, and bios version. These values S1, S2, . . . , SN are static in the sense that they do not usually change during the operation of an application. Dynamic data 460 may contain current or prior reports of system behavior or performance. The dynamic data is generally dynamic information, such as current CPU, memory, and disk use, all of which change as an application performs operations, and reads and writes information to memory and disk. The values M1, M2, M3 . . . for this dynamic data 460 may be obtained by a monitor program 137 which, for example, scans the system for CPU, memory, and disk use at specific increments of time. Suggestions 480 consist of alphanumeric information (R1, R2, R3, . . . ) that may be supplied to the user (e.g., recommendations or warning messages) for particular applications. The optimizer program 136 may scan a row or record 430 of database 400 to optimize a single, particular application, or it might join the results of numerous rows to optimize for a set of concurrently running applications designated by identifiers 410. Note that in FIG. 4, parameters A1, A2, A3 . . . control application settings. Parameters S1, S2, S3 . . . control system settings. Parameters M1, M2, M3 . . . control dynamic settings. Parameters R1, R2, R3 . . . are recommendations.

Figure 5:
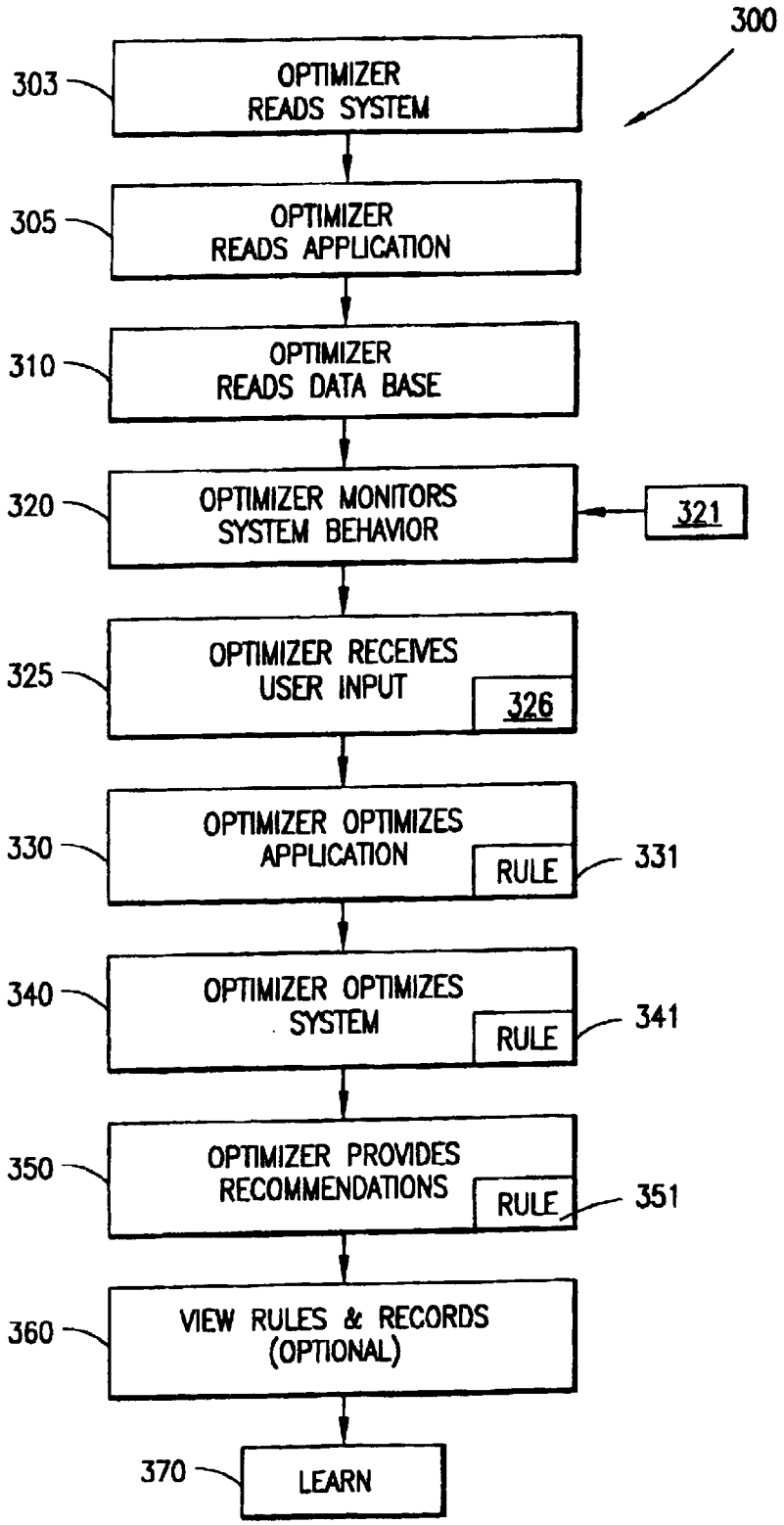
FIG. 5 is a flow chart depicting the steps performed in the optimization.

FIG. 5 comprises a flow chart for an optimization process 300 that the local computer 12 or server 130 uses to optimize software applications 138 and system response or utilization, or to provide recommendations 480. In step 303, the optimizer 136 gathers relevant system information including: operating system 150 version and release data, installed hardware components, hardware configuration, and software configurations. For example, the optimizer determines the size of RAM, BIOS level, installed options etc. This information gathering can be accomplished using standard operating system or other commands. For example, on Microsoft's Windows NT operating system, the "Winmsd/f" calls, the Win32 API, queries to the system registry, and other methods known to those skilled in the art, allow the optimizer to collect such information. In step 305, the optimizer 136 gathers relevant application information, for example, release version, installed options, etc. In step 310, the optimizer 136 reads records 430 from database 140, that control various parameters 420, associated with a particular application name 410. The database 140 may reside on a remote computer or server 130 accessed over a network 110 or on the local computer 12.

In step 320, the optimizer 136 monitors system 12 behavior. For example, the optimizer may query the current CPU use, memory use, or other activity 321 using operating system commands known to those skilled in the art. Also, a monitor program 137 may use such commands to monitor such activity. This monitor program 137 may contain a graphical user interface 139 that displays such activity in graphical form, such as with bar graphs, pie carts, numerical indicators, gauges, etc. This activity 321 may be stored in the form of dynamic values M1, M2, . . . , MN in settings 460 and read by the optimizer program 136. Alternatively, the values corresponding to system activity/use may be directly obtained using operating system commands. One benefit of storing the dynamic data is that the optimizer 136 may compare current to past system activity. In this step 320, the optimizer also may perform performance measurements to "benchmark" the system by running built-in test routines. For example, the optimizer may time the rotation of a 3-D graphical object to assess the speed of the graphics subsystem 166.

In step 325, the optimizer 136 reads user input. For example, the user may enter text or data at the keyboard 40 (or with various input devices 46, 48, 50, or by voice input using audio input device 51) that specifies a level of optimization 326. This level of optimization may control which of the application settings 420 are used to optimize the application in step 330 or optimize the system 12 in step 340. A user wishing to have maximum performance may, for example, sacrifice graphic quality controlled in applications settings 420, that are generally read upon invocation of application 138.

By way of example, the optimizer 136 can adjust the following parameter settings 420, in the Unigraphics control file to adjust performance. (Unigraphics is an graphically-intensive engineering application created by EDS.) The values for each of these settings may be determined in step 325 and stored in record 430.

Low Performance settings

*Ugraf130.realTimeDynamics: TRUE

*Ugraf130.suppressAutoRefresh: FALSE

*Ugraf130.backfaceCulling : FALSE

*Ugraf130.depthSortedWireframe: TRUE

*Ugraf130.lineAntialiasing: TRUE

*Ugraf130.disableTranslucency: FALSE

High Performance settings

*Ugraf130.realTimeDynamics: FALSE

*Ugraf130.suppressAutoRefresh: TRUE

*Ugraf130.backfaceCulling: TRUE

*Ugraf130.depthSortedWireframe: FALSE

*Ugraf130.lineAntialiasing: FALSE

*Ugraf130.disableTranslucency: TRUE

In this example, if a user sets suppressAutoRefresh to TRUE, the application performance can improve by reducing excess redrawing. "Low Performance" is generally correlated with higher graphical quality. The "level" of optimization 326 may correspond to the number of "high performance" settings selected. For example, highest performance (highest level of optimization) may correspond to the use of all the settings in their high performance states. Lower levels of optimization correspond to fewer of the high-performance settings being used. Those values that constitute high performance settings may be stored in application settings 420.

Similarly, the optimizer also optimizes system settings 440. These are settings independent of applications and generally associated with the computer or its hardware or software components. For example, the graphics card may have general settings that control the resolution, color depth, synchronization on vertical refresh, and other features. The disk may have a fragmentation state which may be altered. The size of "swap" spaces may be specified. These system settings are sometimes stored in the system registry or in initialization files which may be modified using methods known to those skilled in the art.

Returning to step 325 in FIG. 5, as an alternative to text, a graphical user interface 139 may be used to provide input data. For example, a graphical depiction of a slider may be used to control the program optimization level by causing the optimizer 136 to optimize 330 the application by writing discrete records in an application configuration file 141 stored on disk. See step 330. Such a file as the configuration file 141 is typically read by an application when the application starts and controls various performance characteristics of a particular application. The audio input device 51 also permits speech input in step 325. Generally speaking, in steps 330 and 340, the optimizer uses the information acquired in steps 303, 305, 310, 320, and 325 to adjust system or application parameters in order to optimize the operation of the application. For example, the ensemble of data from 310, 320, and 325 may cause the optimizer to not only specify settings to the application but also to the graphics card, or system to alter the speed of the application. In general, the optimizer adjusts system and application settings to best meet user-specified quality/performance trade-offs. The information gathered in steps 303, 305, and 320 may be stored in the database 140 maintained by the optimizer. The database can be helpful in determining changes to system and application configurations at different points in time, in evaluating the effects of changing application settings, and in comparing actual system/application settings with recommended settings.

In step 350, the optimizer 136 may provide suggestions or recommendations 480, for example, in the form of specific text that is output to the user. This output may appear in the optimizer's graphical user interface 139, in a web browser 90, or as audible sound played through speakers 54 another audio output device. These recommendations may be used to warn the user of various conditions (e.g. "disk space is low"), or give suggestions on how to improve performance (e.g. "purchase more memory"). The optimizer contains rules 331, 341, 351 that it uses to make such optimizations 330, 340 and recommendations 350. For example, a rule may be: If A1=yes, and S1=200 MHz, or M1=90%, then make suggestion and change (in step 340) the graphic card settings (e.g. 450) that control "synchronization on vertical refresh". In this example, S1 corresponds to the processor frequency, and M1 corresponds to the percentage of memory used. A rule may consist of a set of conditionals and Boolean operations (e.g. if A and B are true and C is false then make suggestions and take action).

Note that the suggestions 480, entire records 430, and rules 331, 341, 351 may be segregated into different files in database 400, stored at a local machine 12 or remote machine 130. Users may view (360) the rules 331, 341, 350, records 430, and suggestions 480 using graphical user interface 53, which may visually segregate these items based on origin of the suggestions (e.g. companies, individuals, etc.), severity, date, or other criteria. These rules and suggestions may be web accessible (using network 110) for dynamic optimization across the web using a propriety program product at the web server.

Figure 1:
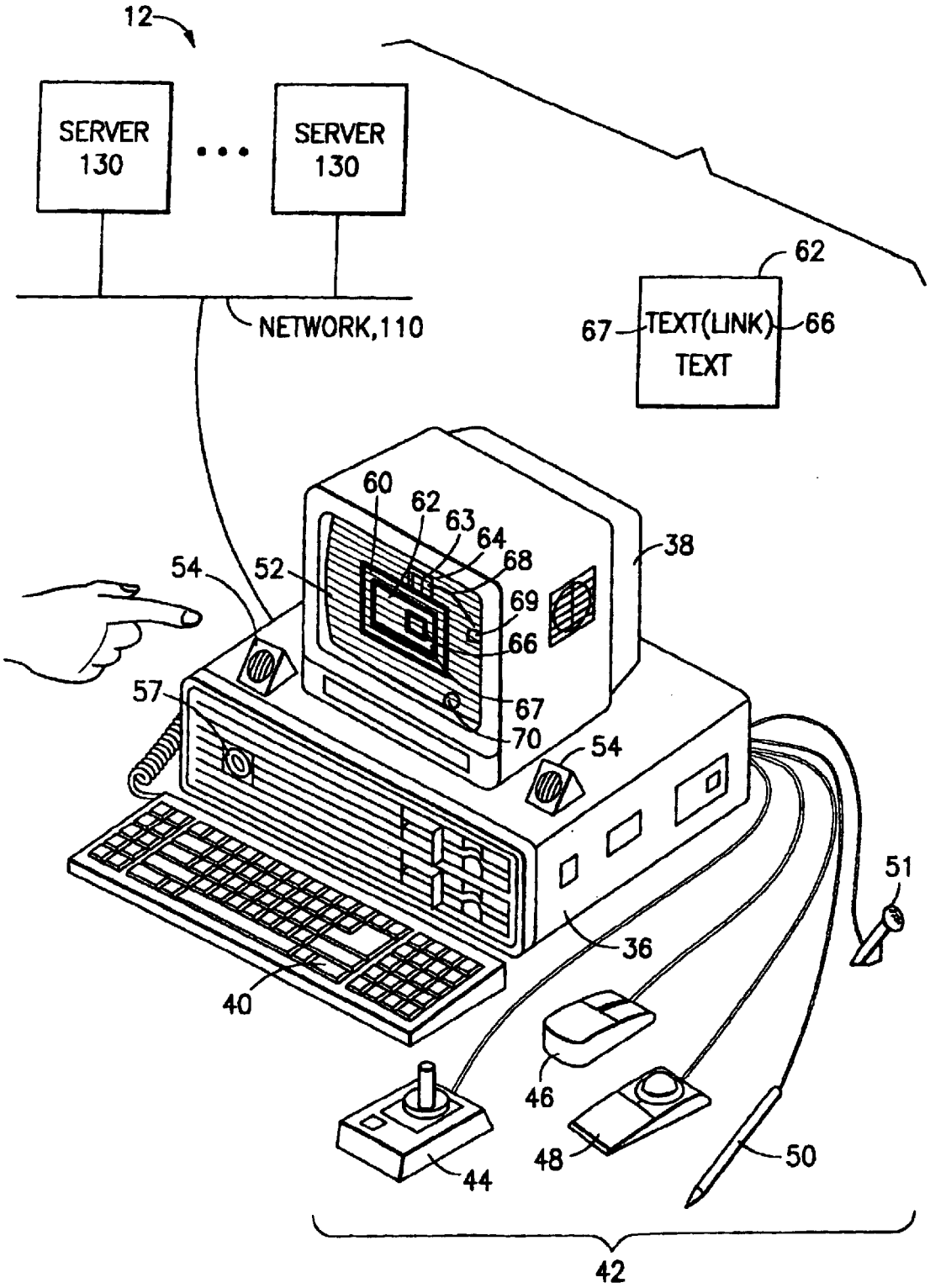
FIG. 1 PRIOR ART
FIG. 1 depicts a pictorial representation of an example computer system that embodies the present invention.

Referring to FIGS. 1 and 5, note that the rules 331, 341, 351 may also be represented as icons 63 displayed on the graphics screen. (These icons representing rules are hereafter sometimes referred to as "iconic rules".) Particular rules may be selected 64 from a set of available rules by the user and dragged 68 to an icon 69 representing the optimizer 136 so that the optimizer will implement 330, 340, 350 the rules. Additionally, the rules 331, 341, 351 may require password protection so that only certain users or classes of users have permission to implement the rules. In an example scenario, a user drags 68 an iconic rule 63 to optimizer icon 69. This rule may require that the graphical quality be degraded for a model part if the model part consists of greater than 100,000 triangular facets. (This will enhance the display speed of the model part.) When the user drops the iconic rule on the optimizer icon, the user must enter a password (e.g. consisting of a keyboard entry, speech input, mouse swipes, a sequence of mouse key presses, a secret position on the optimizer icon, or by other means) before the rule is acted upon in steps 330, 340, or 350. In another embodiment, the rules are dragged to a region 70 of the screen and not to the optimizer icon in order for the rules to take effect. Password protection may be useful in a variety of situations, for example, if certain rules are being tested by developers and administrators or if certain rules cause actions that should be restricted (e.g. access to confidential databases, CPU or cost-intensive jobs, the allocation of e-money and credit information, etc.)

The optimizer in steps 330, 340 and 350 may learn 370 from a user's past activity. For example, if the user has always used an application with small files, and past CPU use has always been low (e.g. as stored in settings 470), the software optimizer can make suggestions (480), accordingly. Note that one benefit of having portions of the database 140 (e.g. the settings and suggestions) and rules 331, 341, and 351 on a remote machine 130 is that a company or system administrator can continually manage and update messages and rules as new information is provided by application vendors. When a user runs an application in 410, the user can make use of the latest information in the database. If the database 140 resides on a remote machine 130 the optimization 330, 340, and 350 can be performed either on the local machine or the remote machine. If performed on a remote machine, messages and other parameters are fed from the remote server 130 to the client 12 using the network 110.

Figure 6:
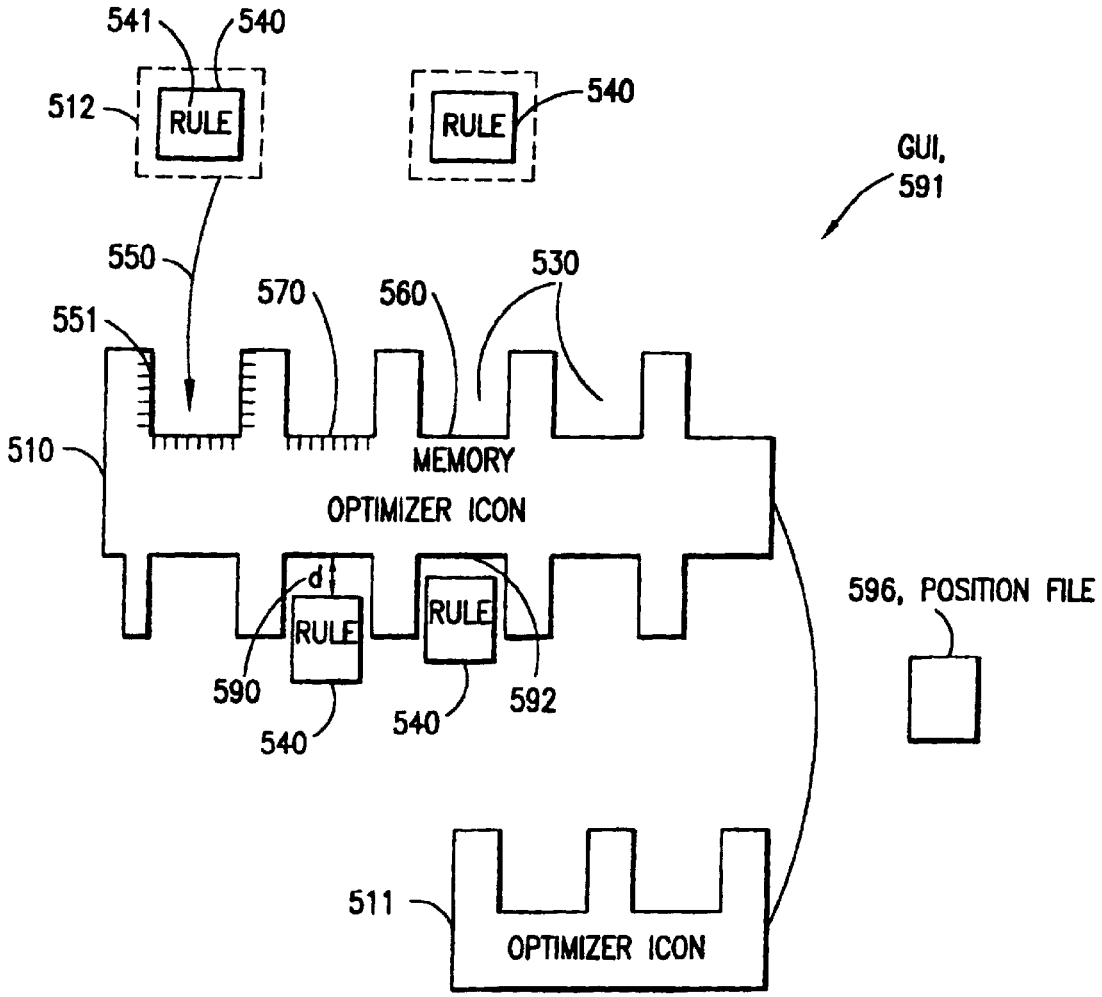
FIG. 6 is a schematic illustration display with an optimizer and rule icons thereon.

FIG. 6 is a block diagram of a GUI 591 with rule icons 540,63 (See FIG. 1.) including optimizer icons 69, 510, 511. In the present invention, the user uses a selection device such as mouse 46 to select 512 an icon 540 and drags 550 the icon to optimizer icons 510, 511. If the icon 540, representing a rule, is touching or close (within a threshold distance 590) to the optimizer icon 510, then the rule 541, 331, 341, 351 is applied. In other words, "closeness" of an icon is determined by computing the distances from the selected icon 540 to regions 520 of the optimizer icon displayed on the GUI. If the distance is smaller than a particular threshold 592, the icon 540 is close to a region of the optimizer.

In one embodiment, the optimizer icon 510 consists of different regions 520 to which iconic rules 540 are dragged. The optimizer software determines near what location 520 icon is positioned using techniques which are well known to those skilled in the art of GUI interfaces. In addition to performing general optimization, the optimizer icons 510 may be used to specify the 'nature' of the update; for example, one optimizer icon 510 may be specified for optimization concerning graphics, while another icon 511 may be specific for controlling all aspects of memory and disk space. The optimizer icon may change its graphical attribute such as color or brightness 570 in response to the information gained when the optimizer software applies the rules 541. For example, once a rule is successfully applied, then the optimizer region 520 may turn red 570. The iconic rules 541 may also change graphical attributes in a similar manner. (Changes in graphical characteristics of the iconic rules and optimizer icons are carried out in step 670 in FIG. 7).

The rule application can be carried out by the optimizer software by comparing the position 585 of icon 540 to values stored in a position file 596 which may be stored on disk.

The optimizer icon 510 may also contain graphical indications of regions 520, such as cutouts 530, to which iconic rules 540 may be dragged. In this manner, when the icons are placed in the optimizer icon 510 there can be a graphical indication 551 of the binding to the user. Additionally, the area around the cutout may change color or brightness 570 once an icon 540 is located in the cutout. The use of discrete cutouts 530 may be useful when only a limited number of rules may be used. The rules may be evident to the user by text 560 written on the optimizer icon or by colors 570.

Figure 7:
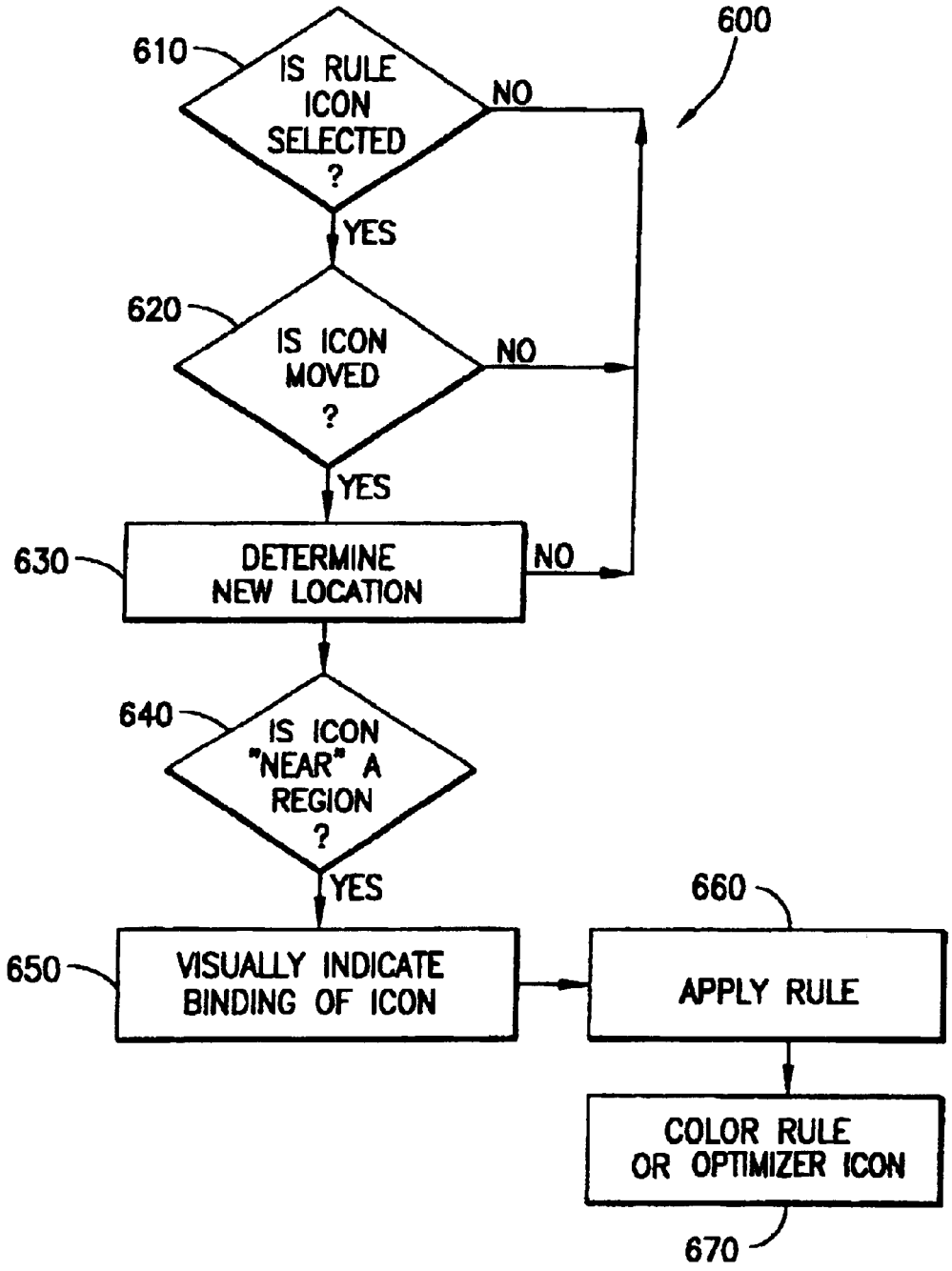
FIG. 7 is a flow chart showing the steps of one preferred method of the present invention pertaining to the use of iconic rules.

FIG. 7 is a flow chart 600 showing the steps 600 performed for a preferred version of optimizer 163 executed by the system in FIG. 1. In step 610, a program checks if an icon 540 (e.g., if an iconic rule) is selected. The selected icon 540 may be selected by any selection method: e.g., pointing and clicking or by an application program If the icon is moved 620, its new location is determined 630. If the icon is near (within a threshold distance 590 from) an optimizer region 520 (step 640), then a visual indication 650 of placement such as changing color or brightness 570 of a region 520 optionally may be given. As stated in the description of FIG. 5, the region 520 may be graphically depicted as cutouts 530 to help give users a graphical (visual) indication of the placement. Also as mentioned in the description for FIG. 5, "nearness" or "closeness" is determined by computing the distances from the selected icon to all optimizer icons regions 520 on the GUI. In one preferred embodiment, distances are computed using known geometrical methods. For example, if (x1,y1) are the coordinates of an icon 540 and (x2,y2) are the coordinates of a region 520, then the distance is d-sqrt ((x2−x1)2+(y2−y1)2). This formula may be extended to include additional variables for higher dimensional spaces, such as in a virtual reality or three-dimensional environment. An optimizer table (file) 596 on disk may store the x,y locations of regions 520.

The rule 541 represented by an icon 540 is applied 660. The icon 540 or optimizer icon 510 optionally may change color, brightness, texture, blink rate, shape, size, or other graphical attribute (see step 670). This graphical attribute may be a function of the nature of the rule. For example, an iconic rule that increases graphics quality may be red. An icon representing a rule that decreases graphics quality may be green. The optimizer icon may change colors when the rule is successfully applied or has a beneficial effect.

Having thus described our invention, what we claim as new and desire to secure by Letters Patent is:

1. In a computer system, a method of enhancing program application [or system] performance of said computer system, said method comprising:

a. determining configuration information of said computer system;

b. determining performance capabilities of said computer system based on known characteristics and behaviors of said program application; and c. *automatically* optimizing configuration parameters of said program application in response to said configuration information and said performance capabilities.

2. A method as recited in claim 1, further comprising:

a. determining user preferences for the operation of said computer system and further *automatically* optimizing said computer system in response to said user preferences.

3. A method as recited in claim 1, *wherein said* determining performance capabilities of said computer system comprises:

a. comparing system performance against previous system performance, where said previous system performance is stored in a database with said configuration parameters.

4. A method as recited in claim 2, wherein said user preferences are determined using a graphic user interface through which a user enters said user preferences.

5. A method as recited in claim 1, further comprising:

a. providing recommended system configurations in response to said performance capabilities that are determined.

6. A method as recited in claim 1, wherein said configuration information comprises at least one of the following:

a. CPU speed, memory capacity, disk subsystem capabilities, system BIOS version, graphics adapter type, driver levels, operating system software and service pack release levels.

7. A method as recited in claim 1, wherein said performance capabilities comprise at least one of the following:

a. CPU performance for integer and floating point tasks, memory subsystem throughput, disk subsystem throughput, b. 3D graphics performance, and c. 2D graphics performance.

8. A method as recited in claim 1, wherein said computer system can operate according to a plurality of rules of operation, wherein said graphic user interface comprises user selectable rule icons, each of which represents one of said rules of operation for said computer system, and wherein a user can select at least one of said rules of operation by selecting at least corresponding one of said rule Icons.

9. A method as recited in claim 8, wherein said user selects one of said rule icons by dragging and dropping said one icon to an optimizer icon, wherein said dropping results in the application of said selected one rule of operation.

10. A method as recited in claim 9, wherein said optimizer icon comprises a plurality of locations, each location capable of accepting one of said rule icons, wherein one of said rules is implemented when a corresponding one of said rule icons representing said one rule is placed on said graphical user interface within a threshold distance of said one location.

11. A method as recited in claim 10, wherein each location is visually distinguished.

12. A method as recited in claim 10, wherein each location is visually distinguished by at least one of the following characteristics: color, outline, textures, and brightness.

13. A method as recited in claim 10, wherein each location is spatially distinguished.

14. A method as recited in claim 10, wherein at least one of said locations is a cutout on said optimizer icon.

15. A method as recited in claim 10, wherein there is a visual indication that one of said rule icons is within said threshold distance.

16. A method as recited in claim 1, further comprising:

a. storing said known characteristics and behaviors of said program application in a database.

17. A method as recited in claim 16, wherein said database is hard-coded into said program application.

18. A method as recited in claim 16, wherein said database is stored as a table.

19. A method as recited in claim 16, wherein said database is constructed by the user via a graphical user interface that uses a drag-and-drop paradigm to construct rules by combining graphical user interface components representing components of the rule.

20. A method as recited in claim 16, wherein said database is stored in a storage device that is remote from said workstation.

21. A method as recited in claim 1, wherein said computer system comprises a server and a remote station which can be interconnected to each other through a communications network.

22. A method as recited in claim 1, further comprising optimizing configuration parameters of said computer system in response to said configuration information and said performance capabilities.

23. A method as recited in claim 1, wherein determining performance capabilities of said computer system comprises:

a. determining real time resource utilization when said program application is being executed.

24. A method of running an application program on a computer system to accomplish a user selected result in the running of the application program, said method comprising:

a. determining the utilization of selected resources of said computer system at selected intervals during the running of the application program;

b. comparing said resource utilization with predefined thresholds; and c. alerting a user of said computer system to alter application program parameters if said resource utilization comparison satisfies predefined criteria with respect to said thresholds.

25. A method as recited in claim 24, wherein said predefined criteria comprises a combination of resource utilization requirements for a set of said resources of said computer system.

26. A method of enhancing computer systems performance, said method comprising:

a. monitoring user activity;

b. determining user activity patterns;

c. matching said user activity patterns against entries in a database; and d. *performing at least one of* making suggestions [or] *and* alerting said user to alter at least one of computer system parameters and application program parameters in accordance with said entries.

27. A program storage device readable by machine, tangibly embodying a program of instructions executable by the machine to perform method steps for enhancing program application [or system] performance of a computer system, said method steps comprising:

a. determining configuration information of said computer system;

b. determining performance capabilities of said computer system based on known characteristics and behaviors of said program application; and c. *automatically* optimizing configuration parameters of said program application in response to said configuration information and said performance capabilities.

28. A program storage device readable by machine, tangibly embodying a program of instructions executable by the machine to perform method steps for running an application program on a computer system to accomplish a user selected result in the running of the application program, said method steps comprising:

a. determining the utilization of selected resources of said computer system at selected intervals during the running of the application program;

b. comparing said resource utilization with predefined thresholds; and c. alerting a user of said computer system to alter application program parameters if said resource utilization comparison satisfies predefined criteria with respect to said thresholds.

29. A program storage device readable by machine, tangibly embodying a program of instructions executable by the machine to perform method steps for enhancing computer systems performance, said method comprising:

a. monitoring user activity;

b. determining user activity patterns;

c. matching said user activity patterns against entries in a database; and d. *performing at least one of* making suggestions [or] *and* alerting said user to alter at least one of computer system parameters and application program parameters in accordance with said entries.

30. A system for enhancing program application [or system] performance of a computer system comprising:

a. means for determining configuration information of said computer system;

b. means for ascertaining performance capabilities of said computer system based on known characteristics and behaviors of said program application; and c. processing means for automatically optimizing configuration parameters of said program application based on said configuration information and said performance capabilities.

31. The system of claim 30 further comprising notifying means for notifying a user of said optimal configuration parameters.

32. The system of claim 30 wherein said automatically optimizing comprises automatically resetting configuration parameters of said program application.

*33. In a computer system, a method of enhancing program application performance of said computer system, said method comprising:*

*a. determining performance capabilities of said computer system based on known characteristics and behaviors of said program application; and*

*b. automatically optimizing configuration parameters of said program application in response to said performance capabilities.*

*34. A method as recited in claim 33, further comprising:*

*a. determining user preferences for the operation of said computer system and further automatically optimizing said configuration parameters of said program application in response to said user preferences.*

*35. A method as recited in claim 33, wherein said determining performance capabilities of said computer system comprises:*

*a. comparing system performance against previous system performance, where said previous system performance is stored in a database with said configuration parameters.*

*36. A method as recited in claim 34, wherein said user preferences are determined using a graphic user interface through which a user enters said user preference.*

*37. A method as recited in claim 33, further comprising:*

*a. providing recommended system configurations in response to said performance capabilities that are determined.*

*38. A method as recited in claim 33, wherein said performance capabilities comprise at least one of the following:*

*a. CPU performance for integer and floating point tasks, memory subsystem throughput, disk subsystem throughput,*

*b. 3D graphics performance, and*

*c. 2D graphics performance.*

*39. A method as recited in claim 33, wherein said computer system can operate according to a plurality of rules of operation, wherein said graphic user interface comprises user selectable rule icons, each of which represents one of said rules of operation for said computer system, and wherein a user can select at least one of said rules of operation by selecting at least corresponding one of said rule icons.*

*40. A method as recited in claim 39, wherein said user selects one of said rule icons by dragging and dropping said one icon to an optimizer icon, wherein said dropping results in the application of said selected one rule of operation.*

*41. A method as recited in claim 40, wherein said optimizer icon comprises a plurality of locations, each location capable of accepting one of said rule icons, wherein one of said rules is implemented when a corresponding one of said rule icons representing said one rule is placed on said graphical user interface within a threshold distance of said one location.*

*42. A method as recited in claim 41, wherein each location is visually distinguished.*

*43. A method as recited in claim 41, wherein each location is visually distinguished by at least one of the following characteristics: color, outline, textures, and brightness.*

*44. A method as recited in claim 41, wherein each location is spatially distinguished.*

*45. A method as recited in claim 41, wherein at least one of said locations is a cutout on said optimizer icon.*

*46. A method as recited in claim 41, wherein there is a visual indication that one of said rule icons is within said threshold distance.*

*47. A method as recited in claim 33, further comprising:*

*a. storing said known characteristics and behaviors of said program application in a database.*

*48. A method as recited in claim 47, wherein said database is hard-coded into said program application.*

*49. A method as recited in claim 47, wherein said database is stored as a table.*

*50. A method as recited in claim 47, wherein said database is constructed by the user via a graphical user interface that uses a drag-and-drop paradigm to construct rules by combining graphical user interface components representing components of the rule.*

*51. A method as recited in claim 47, wherein said database is stored in a storage device that is remote from said workstation.*

*52. A method as recited in claim 33, wherein said computer system comprises a server and a remote station which can be interconnected to each other through a communication network.*

*53. A method as recited in claim 33, further comprising optimizing configuration parameters of said computer system in response to said performance capabilities.*

*54. A method as recited in claim 33, wherein determining performance capabilities of said computer system comprises:*

*a. determining real time resource utilization when said program application is being executed.*

*55. A program storage device readable by machine, tangibly embodying a program of instructions executable by the machine to perform method steps for enhancing computer application performance of a computer system, said method steps comprising:*

*a. determining performance capabilities of said computer system based on known characteristics and behaviors of said program application; and*

*b. automatically optimizing configuration parameters of said program application in response to said performance capabilities.*

*56. A system for enhancing program application performance of a computer system comprising:*

*a. means for ascertaining performance capabilities of said computer system based on known characteristics and behaviors of said program application; and*

*b. means for automatically optimizing configuration parameters of said program application in response to said performance capabilities.*

*57. The system of claim 56 further comprising notifying means for notifying a user of said optimal configuration parameters.*

*58. The system of claim 56 wherein said automatically optimizing comprises automatically resetting configuration parameters of said program application.*

* * * * *